US006034621A

United States Patent [19]

Kaufman

[11] Patent Number: 6,034,621

[45] Date of Patent: Mar. 7, 2000

[54] WIRELESS REMOTE SYNCHRONIZATION OF DATA BETWEEN PC AND PDA

[75] Inventor: Steven B. Kaufman, Bridgewater, N.J.

[73] Assignee: Lucent Technologies, Inc., Murray Hill, N.J.

[21] Appl. No.: 08/972,453

[22] Filed: Nov. 18, 1997

[51] Int. Cl.[7] .................................................. H04Q 7/00

[52] U.S. Cl. .................... 340/825.44; 370/310; 370/340; 455/403

[58] Field of Search ......................... 340/825.44, 825.06, 340/825.14, 311.1; 370/310, 340; 455/403

[56] References Cited

U.S. PATENT DOCUMENTS

| | | | |
|---|---|---|---|
| 5,043,721 | 8/1991 | May | 340/825.44 |
| 5,124,698 | 6/1992 | Mustonen | 340/825.44 |
| 5,257,307 | 10/1993 | Ise | 379/57 |
| 5,473,316 | 12/1995 | Takaya | 340/686 |
| 5,533,097 | 7/1996 | Crane et al. | 379/58 |
| 5,638,450 | 6/1997 | Robson | 380/49 |
| 5,717,737 | 2/1998 | Doviak et al. | 379/58 |

*Primary Examiner*—Jacques H. Louis-Jacques
*Assistant Examiner*—Yonel Beaulieu

[57] ABSTRACT

Wireless communication paths between a PC and a Personal Digital Assistant (PDA) are utilized to synchronize data files between the PC and the PDA. Example wireless communication paths include ) a one-way paging network, a two-way paging network, a Cellular Digital Packet Data (CDPD) network, and a cordless telephone network. Automated updating of remote files is accomplished by invisibly updating using a paging or CDPD network, e.g., either after each change to the data file, after a series of changes to the data file, after exiting the scheduling application program, at predetermined intervals and/or even on-demand. A simple and efficient wireless way to synchronize data files on separate computers which do not require a fixed, direct connection to each other, such as a direct connection through the PSTN, infrared link, or wired or wireless LAN type connection. The synchronization of data files can be updated on a frequent, inconspicuous and convenient basis.

44 Claims, 6 Drawing Sheets

WIRELESS REMOTE SYNCHRONIZATION OF DATA BETWEEN PC AND PDA

BACKGROUND OF THE INVENTION

1. Field of the Invention

This invention relates to the management of scheduling and other information between two isolated electronic computers. More particularly, it relates to simplified, discrete and automated synchronization of calendar and contact-related data between a personal computer (PC) and a remote personal digital assistant (PDA).

2. Background of Related Art

Personal computers (PCs) are well known and extremely popular. Personal digital assistants (PDAs) and other handheld devices, while perhaps being less well known than PCs, are nevertheless very popular, particularly among business persons. A PDA is a small, handheld computer used to write notes, record names, addresses and phone numbers, to develop an appointment calendar, and otherwise keep your life in order. A scheduling program running separately in each of the PC and the PDA maintains separate database information in data files relating to scheduled appointments and contact information.

Scheduling programs running on a PDA or a PC are very convenient for scheduling, for managing appointments, and for storing and organizing personal information, contact information, and group scheduler information electronically. However, for any particular user, it is most desirable to maintain only one set of personal, contact and group scheduler data for each person or group of persons utilizing a scheduling program running on a PC or on a PDA.

Information relating to a scheduler program includes personal information, contact information, and group scheduler information. Contact information includes names, addresses and phone numbers. Group scheduler information includes appointment information, and the date, time and name of the person for which the appointment was made.

Conventional PC and PDA devices provide the ability to synchronize data between a data file maintained by the scheduling program running on a PC and a data file maintained by the scheduling program running on a PDA. FIGS. 5 to 7 show conventional systems using fixed, dedicated connections to synchronize data files maintained by corresponding scheduling programs running separately on a PC and on a PDA.

FIG. 5 shows a PC 600 including a scheduling program 606 which creates and maintains a data file 608 relating to a user's or group of users' appointments, contacts, etc. Commercially available scheduling programs include MICROSOFT Schedule+™, which is part of the WINDOWS 95 OFFICE™, MICROSOFT Outlook™, which is part of the WINDOWS 97 OFFICE™, LOTUS ORGANIZER, SIDEKICK, NETMANAGE, ECCO, NOW UP-TO-DATE and DAY-TIMER ORGANIZER. A PDA 602 includes a corresponding version of the same scheduler program (e.g. Schedule+ or Outlook) with a corresponding data file 614 relating to the user of the PDA's appointments, contacts, etc. In the given example, the data file 608 on the PC 600 contains information relating to a same user or group of users as the data file 614 on the PDA 602.

The conventional PDA 602 synchronizes its data file 614 with the data file 608 of the PC 600 on demand only, and only through a fixed, dedicated connection established between the PC 600 and the PDA 602. In the example of FIG. 5, a direct serial link 616 is established between the serial port 604 of the PC 600 and the serial port 610 of the PDA 602. Using this direct, point-to-point serial link 616, a synchronization routine started on either the PC 600 or the PDA 602 initiates a synchronization of data contained in data files 608, 614 relating to the relevant user or users.

FIG. 6 shows a conventional synchronization connection requiring a fixed, dedicated, point-to-point connection between a PC 600 and a PDA 602 through the public switched telephone network (PSTN) 724. The PC 600 includes a connection to a modem 720. The modem 720 is connected to the PSTN 724. Similarly, the PDA 602 includes a modem accessory 722 which in turn is connected to the PSTN 724. Thus, the PSTN 724 provides a fixed, dedicated, point-to-point communication path between the PC 600 and the PDA 602 to allow synchronization of the data files 608, 614.

FIG. 7 shows a conventional, fixed, point-to-point infrared serial data link used to form a dedicated link between the PC 600 and the PDA 602 to allow synchronization of data files 608, 614. Infrared links typically require line-of-sight placement between the PC 600 and PDA 602 to allow the infrared signal to pass directly between the PC 600 and the PDA 602.

Using conventional methods to link the PC 600 with the PDA 602 to synchronize a users' scheduling data files 608, 614 requires the establishment of a fixed, point-to-point, dedicated link. These fixed, dedicated links require physical placement of the PDA 602 to be within the proximity of the PC 600 (with respect to the direct serial link shown in FIG. 5 or the infrared link shown in FIG. 7), or movement of the PDA 602 to a telephone jack where a cable can be inserted between a modem 722 connected to the PDA 602 and the PSTN 724 (as shown in FIG. 6). In any event, synchronization of a user's data files 608, 614 requires a fixed, dedicated connection between the PDA 602 and the PC 600 for a period of time, which tends to discourage frequent synchronization of data files 608, 614. This is particularly the case when, e.g., the PDA 602 is carried in the pocket of a traveling user who is away from the office containing the PC 600, or a user who carries the PDA 602 into an isolated meeting.

The conventional links between the PC 600 and the PDA 602 are also required to be point-to-point connections between the PC 600 and the PDA 602 for synchronization of relevant user data files 608, 614.

Thus, there is a need to simplify and automate the synchronization of a user's data files 608, 614 as between the scheduling program 606 of the PC 600 and the scheduling program 612 of a PDA 602. Moreover, a more efficient utilization of communication media other than that commensurate with the use of a fixed, dedicated link between the PC 600 and the PDA 602 is also desired.

There is also a need to provide for the simultaneous synchronization of more than just two separate computers containing a user's or group of user's data files.

SUMMARY OF THE INVENTION

The present invention provides a portable computer including a Personal Digital Assistant (PDA) and a paging receiver. The personal digital assistant includes a scheduling program, a data file maintained by the scheduling program, and a synchronization routine for synchronizing the data file with one or more remote data files.

In another embodiment the present invention provides a method of utilizing a paging network to synchronize data files of a PDA with data files of a personal computer (PC).

Any change to a data file on the PC or PDA is monitored. As a result of a change to the data file, a synchronization routine is initiated to prepare a synchronization information data packet, which is transmitted to the other of the PC and PDA over a network, e.g., a one-way or two-way paging network.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention utilizes wireless networks in general to accomplish synchronization between a PC and a PDA type device. Suitable wireless networks include a paging network, a CDPD network, a satellite network, and a network utilizing the cordless telephone interface standards, e.g., the 900 MHz band in the United States.

Figure 1:
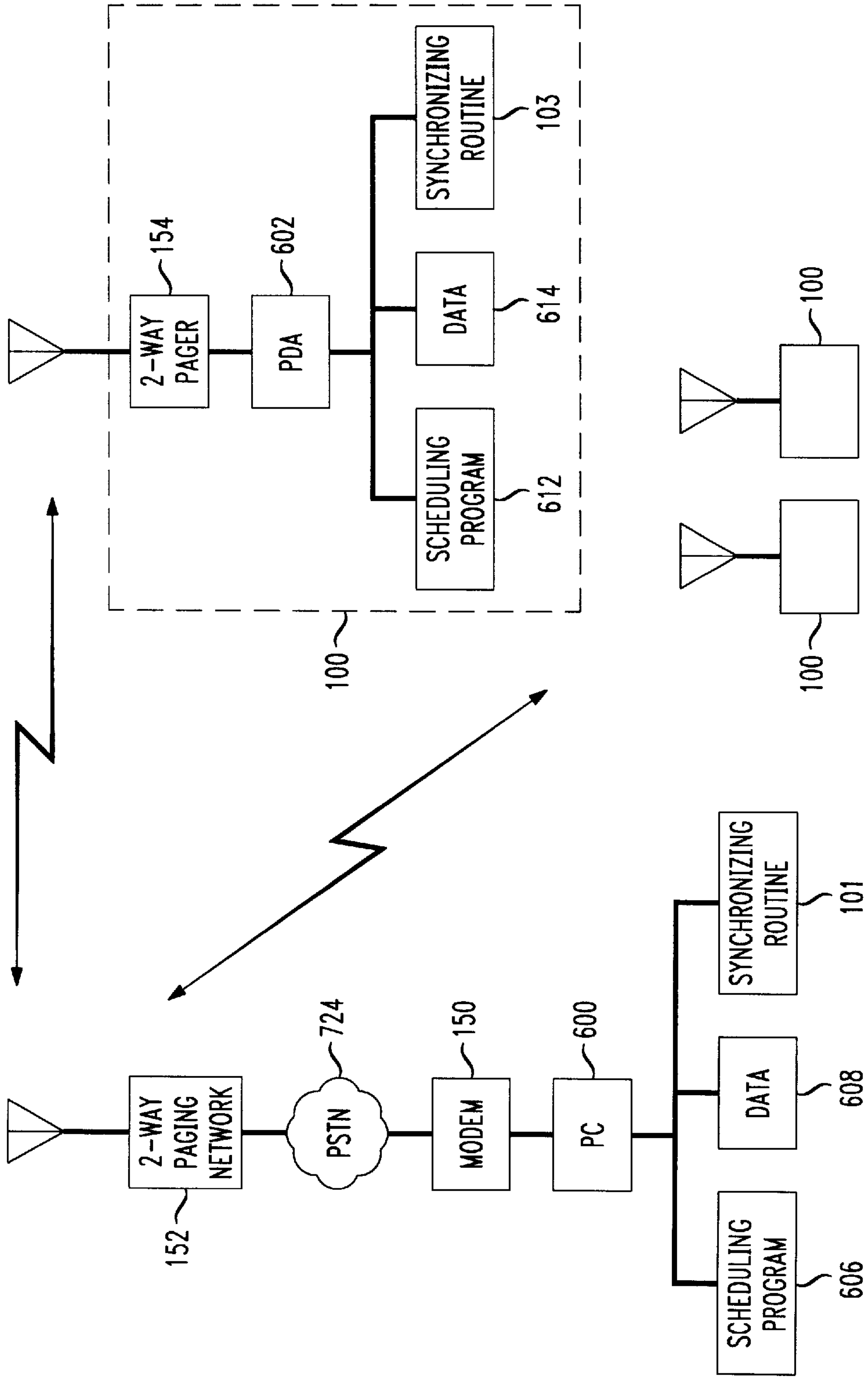
FIG. 1 shows a first embodiment of the present invention utilizing a two-way paging network to synchronize data between a PC and a wireless PDA.

FIG. 1 shows a first embodiment of the present invention utilizing a two-way paging network 152 to accomplish automatic synchronization of data in a data file 608 of a PC 600 with data in data file 614 of a PDA 602.

The PC 600 system includes a conventional scheduling program 606 and a data file or files 608. The PC 600 is connected to a modem 150, which in turn establishes a connection with a two-way paging network 152 through the PSTN 724.

Each wireless remote PDA system 100 includes a PDA 602 for operating a conventional scheduling program 612 corresponding to the scheduling program 606 on the PC 600 system, and a data file or files 614. Additionally, the wireless remote PDA system 100 includes a connection to a two-way pager 154 over which data is passed. The connection may be over a serial port in the PDA 602 to a serial port of the two-way pager 154. Alternatively, if the PDA 602 includes a Personal Computer Memory Card International Association (PCMCIA) type port, a parallel connection may be established between a parallel bus of the two-way pager 154 and the PCMCIA port of the PDA 602.

Two-way paging typically adds a response channel to a traditional one-way paging system. A user can respond to a paging message containing synchronization information in a two-way paging network either using a selection of preprogrammed responses or by formatting a free-form text reply.

Any conventional two-way paging network may be utilized by this embodiment, including those operating under the ReFLEX™ two-way paging open protocol established by MOTOROLA. The ReFLEX™ protocol adds a 12.5 KHz response channel to a traditional one-way paging system. ReFLEX™ protocols work on either 25 KHz or 50 KHz channels in, e.g., the 929–932 and 940–941 MHz frequency band. The ReFLEX™ protocol is currently capable of handling an inbound data rate on a 12.5 KHz channel, e.g., in the 896 to 902 MHz frequency band, at 800, 1600, 6400 or 9600 bits per second (bps), and at an outbound, response data rate of 1600, 3200 or 6400 bps per 25 KHz channel. Encryption may be implemented if desired in the two-way paging protocol to ensure privacy.

The two-way paging network 152 may include use of the Internet for transmission of data to and from the PC 600. In this instance, the PC 600 would gain access to the Internet by any of a multitude of conventional means, including a modem with dial-up access to an Internet Service Provider (ISP).

An appropriate synchronizing routine 101 is included on the PC 600 for synchronization of the data files 608, 614. A corresponding synchronizing routine 103 is included on the PDA 602. In operation, either synchronizing routine 101, 103 can initiate operation of the other through communication over the two-way paging network and pager 152, 154.

In a preferred embodiment, synchronization between the data files 608, 614 takes place after each update or change to either data file 608, 614. For instance, most scheduling or contact programs 606, 612 update the respective data files 608, 614 upon exiting a data base cell. Thus, as a data base cell is changed in either data file 608, 614, the same changes are mirrored to the other data file 608, 614 over the two-way paging network. This 'incremental' synchronization minimizes the amount of data transfer necessary between data files 608, 614 at any one time. To minimize modem activity, this automatic synchronization may take place after n changes to either data file 608, 614, after m minutes of activity, and/or upon exiting from the scheduling program 606 or 612.

Alternatively, larger amounts of data in the data files 608, 614 can be synchronized using an "on-demand" selection using the two-way paging network. In this way, the PC 600 and PDA 602 can operate independently of one another and synchronize data files 608, 614 only upon the push of a 'synchronize' button or other operator selection similar to the conventional 'hot synchronize' button on current PDAs 602 such as the PILOT™ available from US ROBOTICS. Using the two-way paging network and pager 152, 154, even an 'on-demand' synchronization provides conveniences not found in conventional PC/PDA systems. For instance, as long as the wireless remote PDA system 100 is within the range of the two-way paging network 152, the PDA 602 can initiate the synchronization routine 103 and synchronize the data file 608, 614 at any time without the need to hook-up to a telephone jack or to co-locate the PDA 602 with the PC 600.

The synchronization routines of the present invention are as known in the prior art but modified as described herein. One prior art synchronization routine is INTELLISYNC™ from PUMA TECHNOLOGY which works with a HotSync Manager of the PILOT PDA. When synchronization is performed and conflicts arise because of a change made to the same record both on the PDA 602 and on the PC 600, the conflict is either automatically resolved as in prior art synchronization routines, or a user is given a choice as to how to resolve the conflict. Moreover, the synchronization routines of the present invention allow the particular applications and individual fields for which synchronization is to be accomplished as in the prior art systems such as INTELLISYNC™.

The present embodiment is not limited to a point-to-point interconnection between a PC 600 and a PDA 602. Multiple wireless remote PDA systems 100 and PCs 600 may be synchronized substantially simultaneously via the two-way paging network 152. For instance, the initiating PC 600 can be assigned to operate in a Master mode, while all remote PDA systems 100 can be assigned to operate in a slave mode.

Thus, an important feature of this and other embodiments is the utilization of packetized data to provide efficient utilization of a communication path, rather than wasting unused bandwidth of a fixed, dedicated communication path as in the prior art.

Another important feature is that this and other embodiments are not necessarily tied to a point-to-point connection, i.e., they may be implemented to synchronize data files 614 of a plurality of wireless remote PDA systems 100 in a point-to-multipoint configuration with the data file 608 of a PC 600.

Perhaps most importantly the present invention provides an additional level of freedom of movement to the wireless remote PDA system 100 such that it can be synchronized from any location, at any time, without the need to plug the PDA 602 into the PSTN or to co-locate the PDA 602 with the PC 600 as in the prior art. It also allows for discrete synchronization of data files 608, 614 without the knowledge of others in the room with the user, or even the user, of the PDA 602. For example, in a long meeting, the user of the PDA 602 does not have to excuse him or herself to plug the PDA 602 into the telephone system and press an "on-demand" selection switch or other means to get updated, synchronized information about changed or added appointments.

Figure 2:
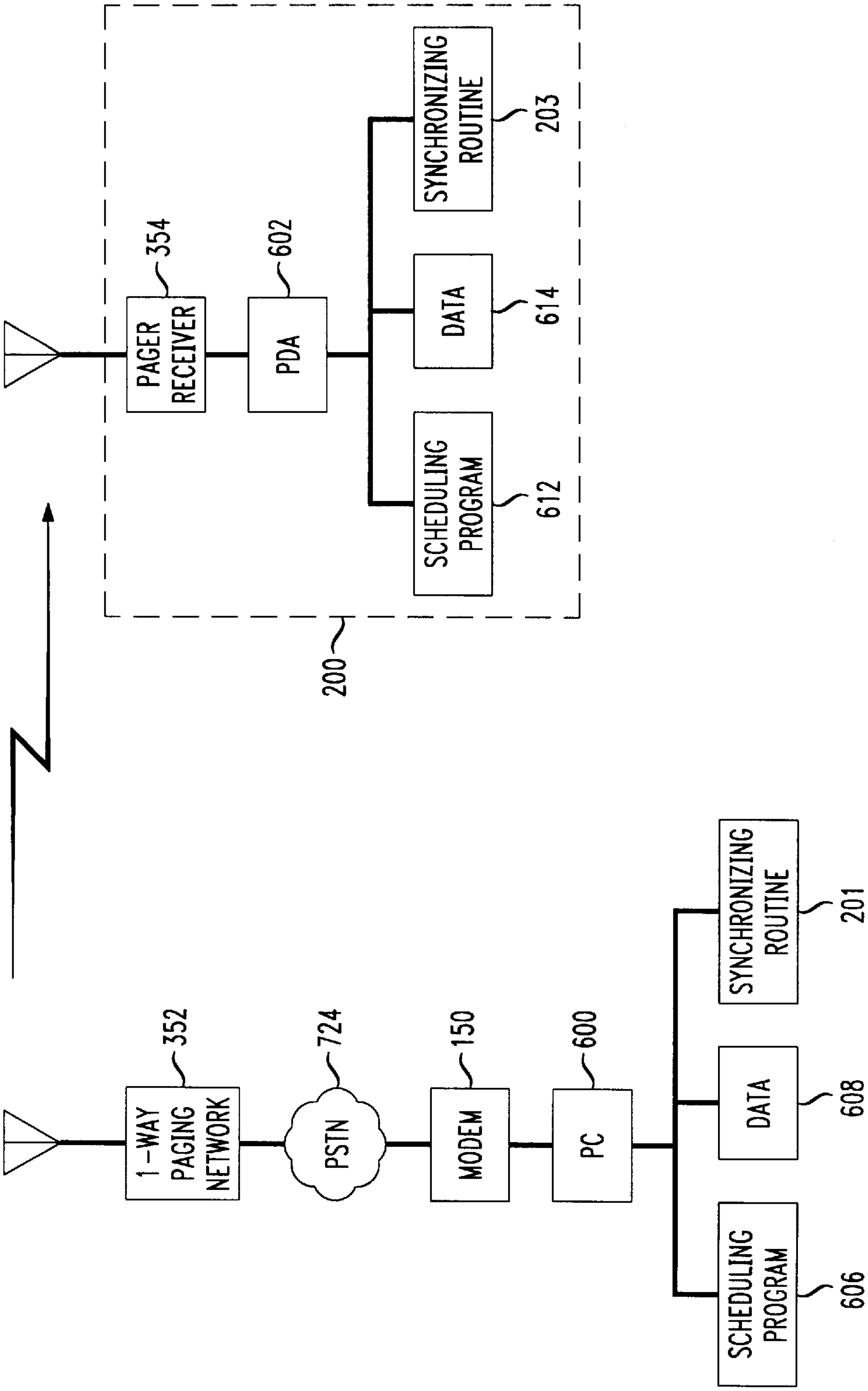
FIG. 2 shows a second embodiment of the present invention utilizing a one-way paging network to synchronize data from a PC to a wireless PDA.

FIG. 2 shows another embodiment of the present invention utilizing a one-way paging system to synchronize one data file, e.g., the PC 600 data file 608, with another data file, e.g., the data file 614 of the wireless remote PDA system 200.

Conventional one-way paging systems are well known. For instance, one-way paging systems utilizing MOTOROLA's FLEX™ protocol are known. The FLEX™ protocol currently operates at three different speeds, 1600, 3200 and 6400 bps. Other conventional protocols which are suitable for one-way paging are Post Office Code Standardization Advisory Group (POCSAG) and GOLAY.

The FLEX™ high speed paging protocol is a fully synchronous paging code which keeps the paging receiver's 354 data-reception electronics continuously in synchronism with the paging transmission even when there is no incoming message from the broadcasting station of the one-way paging network 352. FLEX™ energizes the pager electronics only when data is to be received in real time. This significantly reduces pager power consumption. Of course, one-way paging systems which energize the pager receiver 354 asynchronously with the incoming radio frequency (RF) signal would be suitable for the present embodiment as well.

FLEX™ can be used on a dedicated channel, but can be mixed with paging messages using other protocols such as POCSAG and GOLAY.

In the one-way paging system shown in FIG. 2 the PC 600 passes synchronization information to a one-way paging network 352 via the modem 150 and PSTN 724. Serial or parallel data output from a pager receiver 354 contains synchronization information received from the synchronizing routine 201 of the PC 600. This synchronization information received by the pager receiver 354 interacts with the synchronizing routine 203 and data file 614 of the PDA 602 so as to update the PDA's data file 614 in accordance with changes made to the PC's data file 608.

Some level of reliability from data corruption can be afforded in a one-way paging system by the inclusion of a simple error checksum or cyclic redundancy check (CRC) bit or other method used in conventional one-way paging systems. For instance, FLEX™ provides for data integrity and user confidence by providing prudent error protection against multi-path fading errors caused by simulcasting. FLEX™ has positive end-of message control which is used to avoid receipt by the pager receiver 354 of truncated messages. Optionally, the missed-message flag indicator is passed from the pager receiver 354 to prompt the user to call the administrator or other user operating the PC 600, for any missed updates via standard telephone, or to have the updates re-transmitted. The missed-message flag appears if a paging message containing synchronization information is missed while the PDA 602 is outside the coverage area of the one-way paging network 352.

The synchronizing information passed by the two-way and one-way paging systems may be, e.g., ASCII or unformatted binary data streams, in any mix and in unlimited lengths according to the FLEX™ and REFLEX™ protocols. Extra-long messages are automatically segmented into packets up to 220 bytes by the paging network.

For point-to-multipoint synchronization, the FLEX™ and REFLEX™ protocols offer a GROUP CALL function which delivers common synchronization information to a distribution list of PDAs.

The two-way paging system embodiment shown in FIG. 1 is generally preferred over the one-way paging system embodiment shown in FIG. 2 because of the ability of two-way paging to provide acknowledgments in a return direction. Nevertheless, if lowered reliability in the data file 614 of the PDA 602 is acceptable, then the benefits of automatic synchronization between data files 608, 614 may be accomplished using a one-way paging network 352 as shown in FIG. 2.

To improve reliability in the one-way paging network 352, after a day, a week, etc. of synchronizing data files 608, 614 via the one-way paging network 352, it may be desirable to occasionally correct any data errors which may have occurred during any one of a series of one-way paging network 352 synchronizations by using the direct connection approach as in the prior art.

Figure 3:
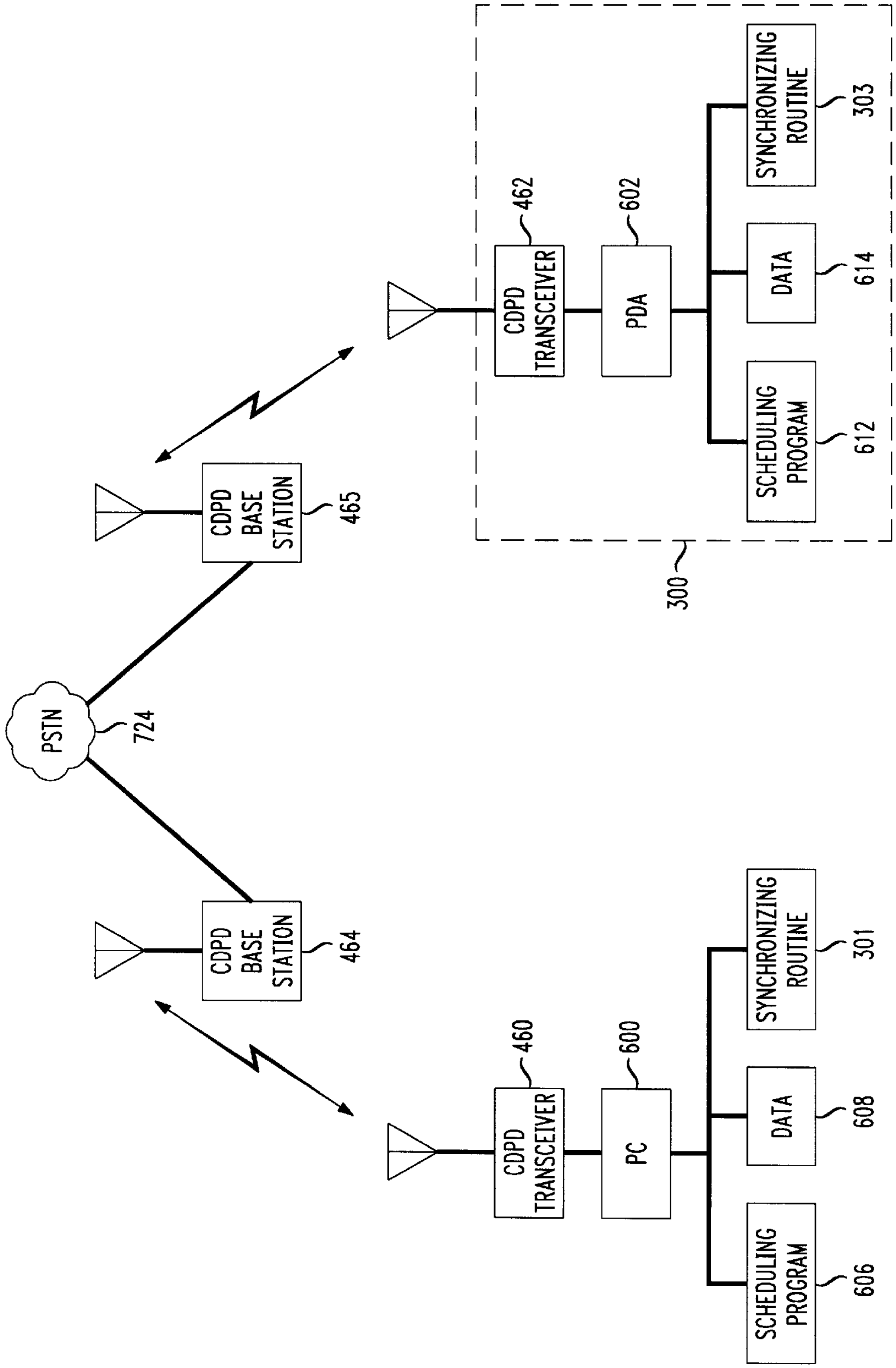
FIG. 3 shows a third embodiment of the present invention utilizing a CDPD network to synchronize data between a PC and a wireless remote PDA.
Figure 4:
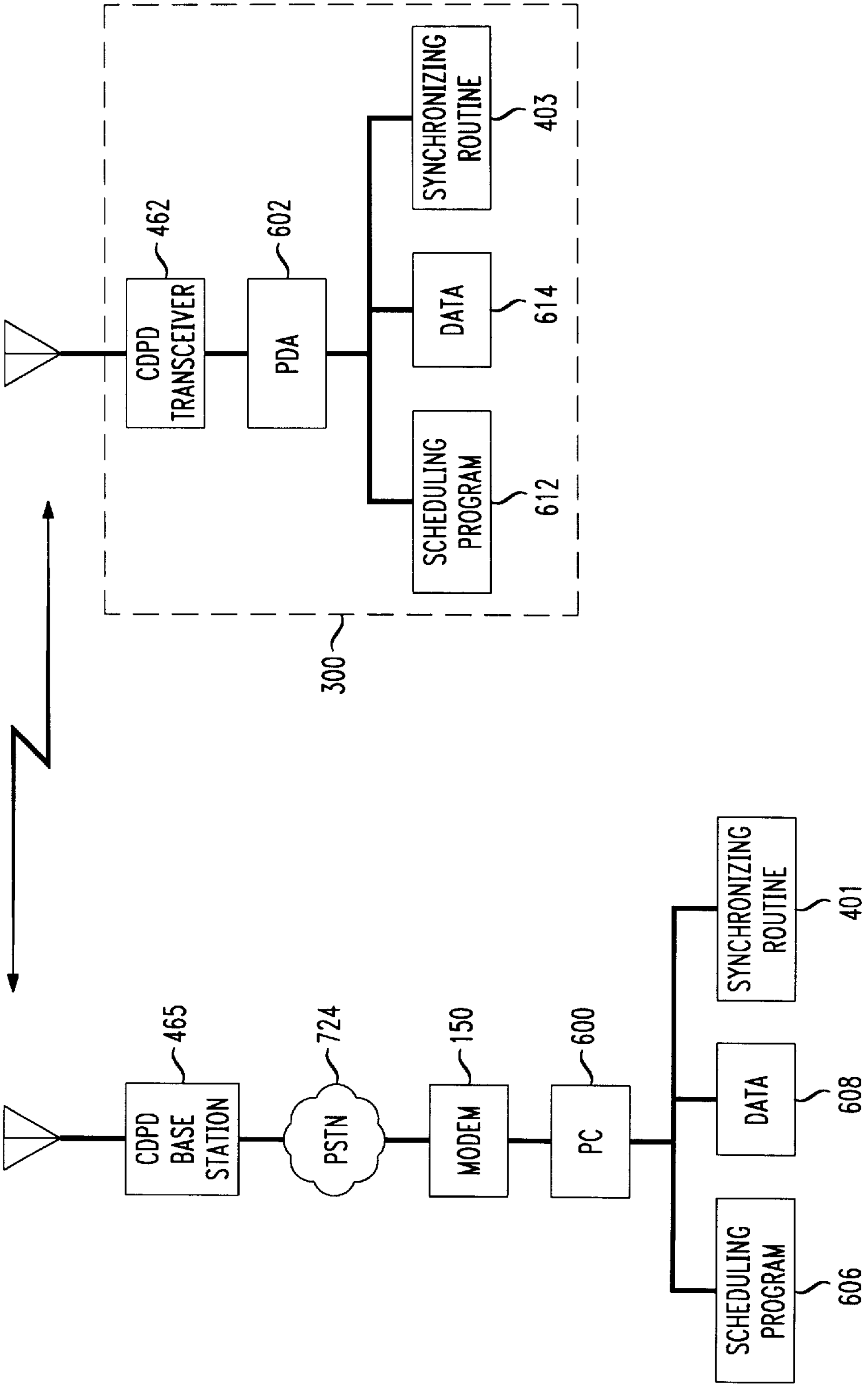
FIG. 4 shows a fourth embodiment of the present invention utilizing the PSTN and a CDPD network to synchronize data between a PC and a wireless remote PDA.
Figure 5:
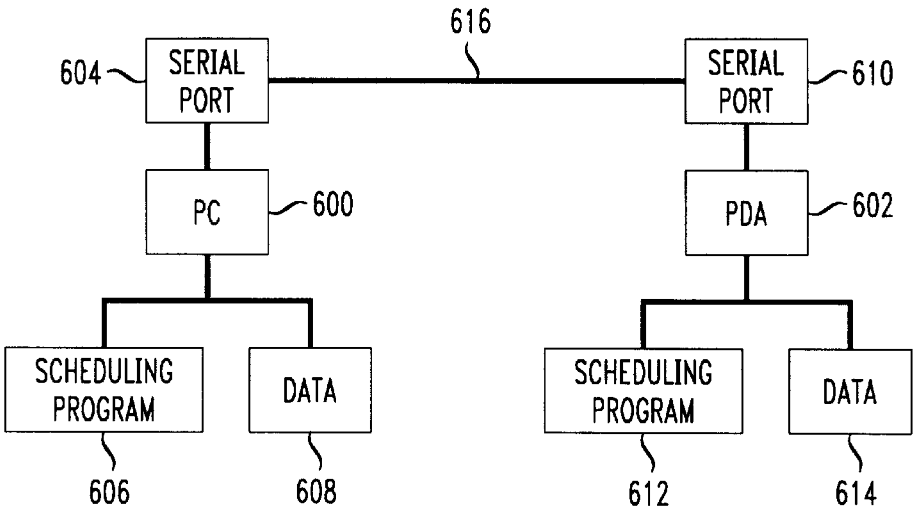
FIG. 5 PRIOR ART
FIG. 5 shows conventional apparatus for synchronizing scheduling data files between a PC and a PDA through a direct serial link.
Figure 6:
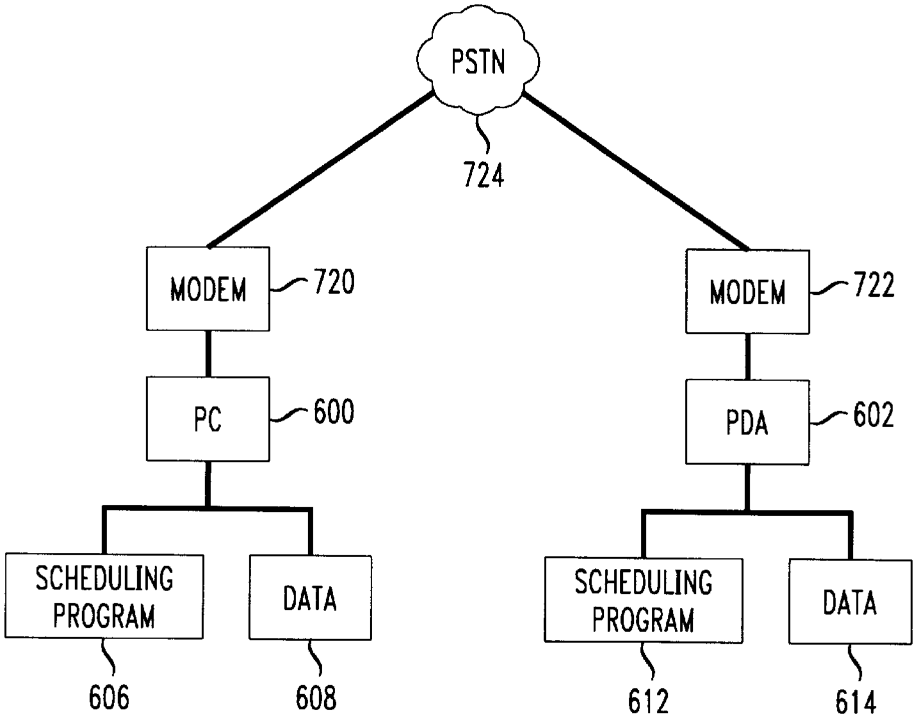
FIG. 6 PRIOR ART
FIG. 6 shows conventional apparatus for synchronizing scheduling data files between a PC and a PDA through modems and the PSTN.
Figure 7:
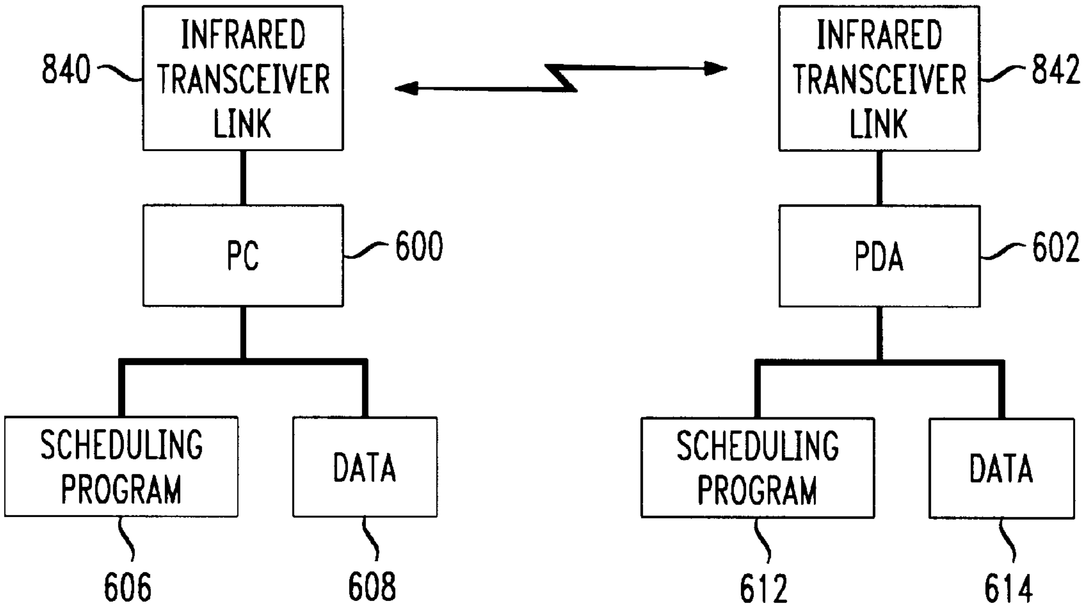
FIG. 7 PRIOR ART
FIG. 7 shows conventional apparatus for synchronizing scheduling data files between a PC and a PDA through an infrared serial data link.

FIGS. 3 and 4 show embodiments of the present invention utilizing a Cellular Digital Packet Data (CDPD) system. CDPD is a wireless standard providing two-way, 19.2 Kbps packet data transmission over existing cellular telephone channels. CDPD and cellular telephones are very well known in the art. FIG. 3 implements the PDA 602 as a roaming remote device, and FIG. 4 implements both the PC 600 and the PDA 602 as roaming remote devices.

In FIG. 3, the PC 600 system and wireless remote PDA system 300 contain scheduling programs 606, 612 and data 608, 614 as in the prior art. However, the PC 600 establishes a connection with a remote CDPD transceiver 460 to implement a two-way synchronization of data files 608, 614 under the control of synchronization routine 301. The PDA 602 may initiate the establishment of the connection with the PC 600, and the synchronization routine 303 may control synchronization of data files 608, 614.

The CDPD transceiver 460 establishes a wireless connection with a CDPD base station 464, which in turn routes the synchronization data from data file 608 through the PSTN 724 to another CDPD base station 465 if necessary before re-transmission to remote CDPD transceiver 462. The remote CDPD transceiver 462 communicates with the PDA 602 via a serial port (e.g. via a 15-pin serial port connector) or via a PCMCIA port if PDA 602 is so equipped.

Either synchronization routine 301, 303 can initiate the synchronization of data files 608, 614. CDPD provides a two-way, relatively high bandwidth channel for fast synchronization of the data files 608, 614.

FIG. 4 shows a CDPD implementation of the present invention with the PC 600 utilizing a direct connection to the CDPD base station 465 via a modem 150 with a dial-up connection to the PSTN 724. The wireless remote PDA system 300 is as described above with respect to FIG. 3.

While the invention has been described with reference to the exemplary preferred embodiments thereof, those skilled in the art will be able to make various modifications to the described embodiments of the invention without departing from the true spirit and scope of the invention.

I claim:

1. A portable computing device comprising:

a personal digital assistant including:

a scheduling program, a first data file maintained by said scheduling program, and a synchronization routine; and a pager in two-way communication with said personal digital assistant;

said synchronization routine being arranged to transmit a synchronization information data packet including information regarding at least one change made to said first data file, via said pager to a remotely located separate computing device having an associated second data file; and said synchronization information data packet being utilizable by said remotely located separate computing device in order to synchronize data of said second data file to data of said first data file.

2. The portable computing device according to claim 1, wherein:

said synchronization of said data of said second data file to said data of said first data file is accomplished automatically.

3. The portable computing device according to claim 1, wherein:

said synchronization accomplishes synchronization of data of a plurality of data files associated with a plurality of remotely located separate computing devices to said data of said first data file.

4. A portable computing device comprising:

a personal digital assistant including:

a scheduling programs a data file maintained by said scheduling program, and a synchronization routine; and a Cellular Digital Packet Data transceiver in two-way communication with said personal digital assistant;

said synchronization routine being arranged to transmit a synchronization information data packet including information regarding at least one change made to said first data file, via said Cellular Digital Packet Data transceiver to a remotely located separate computing device having an associated second data file; and said synchronization Information data packet being utilizable by said remotely located separate computing device in order to synchronize data of said second data file to data of said first data file.

5. The portable computing device according to claim 4, wherein:

said synchronization of said data of said second data file to said data of said first data file is accomplished automatically.

6. The portable computing device according to claim 4, wherein:

said synchronization accomplishes synchronization of data of a plurality of data files associated with a plurality of remotely located separate computing devices to said data of said first data file.

7. A method of utilizing a wireless telephonic network to synchronize a data file of a PDA in two-way communication with said wireless telephonic network with a data file of a PC, comprising:

monitoring a change to said data file of said PC;

after detection of said change to said data file of said PC, triggering a synchronization routine associated with said PC to assemble a synchronization information data packet including information regarding said detected change; and transmitting said synchronization information data packet to said PDA over said wireless telephonic network, said synchronization information data packet being receivable by said PDA over said wireless telephonic network to synchronize said data file of said PDA with said data file of said PC.

8. The method according to claim 7, wherein said wireless telephonic network comprises:

a paging network.

9. The method according to claim 7, wherein said wireless telephonic network comprises:

a cordless telephone network.

10. The method according to claim 7, wherein:

said step of monitoring said change, said step of triggering said synchronization routine, and said step of transmitting said synchronization information data packet are all performed automatically without user intervention.

11. The method according to claim 10, wherein:

said automatically performed steps are performed after each change is stored in said data file of said PC.

12. The method according to claim 10, wherein:

said automatically performed steps are performed after a plurality of changes are stored in said data file of said PC.

13. The method according to claim 10, wherein:

said automatically performed steps are performed at a predetermined time interval.

14. The method according to claim 10, wherein:

said automatically performed steps are performed on-demand.

15. The method according to claim 7, further comprising:

accessing said wireless telephonic network via a Public Switched Telephone Network.

16. The method according to claim 7, further comprising:

accessing said wireless telephonic network via the Internet.

17. A method of utilizing a wireless telephonic network to synchronize a data file of a PC with a data file of a PDA in two-way communication with said wireless telephonic network, comprising:

monitoring a change to said data file of said PDA;

after detection of said change to said data file of said PDA, triggering a synchronization routine associated with said PDA to assemble a synchronization information data packet including information regarding said detected change; and transmitting said synchronization information data packet to said PC over said wireless telephonic network, said synchronization information data packet being adapted receivable by said PC over said wireless telephonic network to synchronize said data file of said PC with said data file of said PDA.

18. The method according to claim 17, wherein said wireless telephonic network comprises:

a paging network.

19. The method according to claim 17, wherein said wireless telephonic network comprises:

a cordless telephone network.

20. The method according to claim 17, wherein:

said step of monitoring said change, said step of triggering said synchronization routine, and said step of transmitting said synchronization information data packet are all performed automatically without user intervention.

21. A method of utilizing a wireless telephonic network to synchronize a data file of a PDA in two-way communication with said wireless telephonic network with a data file of a PC, comprising:

triggering a synchronization routine associated with said PC to assemble a synchronization information data packet including information regarding a detected change; and transmitting said synchronization information data packet to said PDA over said wireless telephonic network, said synchronization information data packet being receivable by said PDA over said wireless telephonic network to synchronize said data file of said PDA with said data file of said PC.

22. The method utilizing a wireless telephonic network according to claim 21, wherein said wireless telephonic network comprises:

a paging network.

23. The method utilizing a wireless telephonic network according to claim 22, wherein:

said paging network is a one-way paging network.

24. The method utilizing a wireless telephonic network according to claim 22, wherein:

said paging network is a two-way paging network.

25. The method utilizing a wireless telephonic network according to claim 22, further comprising:

accessing said paging network via a Public Switched Telephone Network.

26. The method utilizing a wireless telephonic network according to claim 22, further comprising:

accessing said paging network via an Internet.

27. The method utilizing a wireless telephonic network according to claim 21, wherein said wireless telephonic network comprises:

a cellular telephone network.

28. The method utilizing a wireless telephonic network according to claim 21, wherein:

said step of triggering said synchronization routine and said step of transmitting said data synchronization information data packet are performed automatically.

29. The method utilizing a wireless telephonic network according to claim 28, wherein:

said automatically performed steps are performed after each change is stored in said data file of said PC.

30. The method utilizing a wireless telephonic network according to claim 28, wherein:

said automatically performed steps are performed after a plurality of changes are stored in said data file of said PC.

31. The method utilizing a wireless telephonic network according to claim 28, wherein:

said automatically performed steps are performed at a predetermined time interval.

32. The method according utilizing a wireless telephonic network to claim 28, wherein:

said automatically performed steps are performed on-demand.

33. A method of utilizing a wireless telephonic network to synchronize a data file of a PC with a data file of a PDA in two-way communication with said wireless telephonic network, comprising:

triggering a synchronization routine associated with said PDA to assemble a synchronization information data packet including information regarding a detected change; and transmitting said synchronization information data packet to said PC over said wireless telephonic network, said synchronization information data packet being receivable by said PC over said wireless telephonic network to synchronize said data file of said PC with said data file of said PDA.

34. The method utilizing a wireless telephonic network according to claim 33, wherein said wireless telephonic network comprises:

a paging network.

35. The method utilizing a wireless telephonic network according to claim 34, wherein:

said paging network is a one-way paging network.

36. The method utilizing a wireless telephonic network according to claim 34, wherein:

said paging network is a two-way paging network.

37. The method utilizing a wireless telephonic network according to claim 34, further comprising:

accessing said paging network via a Public Switched Telephone Network.

38. The method utilizing a wireless telephonic network according to claim 34, further comprising:

accessing said paging network via an Internet.

39. The method utilizing a wireless telephonic network according to claim 33, wherein said wireless telephonic network comprises:

a cordless telephone network.

40. The method utilizing a wireless telephonic network according to claim 33, wherein:

said step of triggering said synchronization routine and said step of transmitting said data synchronization information data packet are performed automatically.

41. The method utilizing a wireless telephonic network according to claim 40, wherein:

said automatically performed steps are performed after each change is stored in said data file of said PC.

42. The method utilizing a wireless telephonic network according to claim 40, wherein:

said automatically performed steps are performed after a plurality of changes are stored in said data file of said PC.

43. The method utilizing a wireless telephonic network according to claim 40, wherein:

said automatically performed steps are performed at a predetermined time interval.

44. The method according utilizing a wireless telephonic network to claim 40, wherein:

said automatically performed steps are performed on-demand.

* * * * *